(12) United States Patent
Mitsubori

(10) Patent No.: US 9,531,918 B2
(45) Date of Patent: Dec. 27, 2016

(54) SCAN CALIBRATION METHOD THAT ELIMINATES THE COLOR INACCURACY OF PRINTED COLOR CHARTS USED ON SCAN CALIBRATIONS

(71) Applicant: Konica Minolta Laboratory U.S.A., Inc., San Mateo, CA (US)

(72) Inventor: Toshiyuki Mitsubori, Foster City, CA (US)

(73) Assignee: KONICA MINOLTA LABORATORY U.S.A., INC., San Mateo, CA (US)

(*) Notice: Subject to any disclaimer, the term of this patent is extended or adjusted under 35 U.S.C. 154(b) by 17 days.

(21) Appl. No.: 14/586,298

(22) Filed: Dec. 30, 2014

(65) Prior Publication Data

US 2016/0191749 A1 Jun. 30, 2016

(51) Int. Cl.
 *H04N 1/04* (2006.01)
 *H04N 1/60* (2006.01)
 *H04N 1/00* (2006.01)

(52) U.S. Cl.
 CPC ........ *H04N 1/6033* (2013.01); *H04N 1/00023* (2013.01); *H04N 1/00034* (2013.01); *H04N 1/00045* (2013.01); *H04N 1/00063* (2013.01); *H04N 1/00087* (2013.01); *H04N 1/00278* (2013.01); *H04N 2201/0005* (2013.01); *H04N 2201/0094* (2013.01)

(58) Field of Classification Search
 CPC ...... G06K 15/00; G06K 15/005; G06K 15/02; G06K 15/1878; G06Q 10/10; H04N 1/60; H04N 1/603; H04N 1/6052; H04N 2201/0094; H04N 1/00175; H04N 1/00965; H04N 1/2158; H04N 1/32128; H04N 1/32502

USPC ..... 358/1.9, 1.15, 1.14, 1.16, 3.28, 504, 1.1, 358/1.2, 2.1, 401, 406, 500, 501, 505, 358/518; 399/49, 35, 66, 71; 347/19, 224; 382/167; 709/203

See application file for complete search history.

(56) References Cited

U.S. PATENT DOCUMENTS

| | | | | |
|---|---|---|---|---|
| 6,048,117 A * | 4/2000 | Banton | ............ | H04N 1/00002 400/120.09 |
| 6,897,979 B1 * | 5/2005 | Mitsubori | ............ | H04N 1/58 358/1.9 |
| 8,564,861 B2 * | 10/2013 | Henderson | ............ | H04N 1/6033 358/1.9 |
| 8,797,586 B2 * | 8/2014 | Ohishi | ............ | H04N 1/00222 358/1.15 |
| 9,280,734 B2 * | 3/2016 | Kishi | ............ | G06K 15/1878 |

(Continued)

*Primary Examiner* — Negussie Worku
(74) *Attorney, Agent, or Firm* — Buchanan Ingersoll & Rooney PC (57) ABSTRACT

A method is disclosed of executing a scan calibration program on multi-function peripherals, the method includes: receiving a request for initiation of a scan calibration program on a multi-function peripheral; determining whether or not a print calibration should be performed on the multi-function peripheral before printing a calibration chart on the multi-function peripheral, wherein the determination of whether or not to execute the print calibration is based on a predetermined condition of the multi-function peripheral; executing the print calibration on the multi-function peripheral, if the predetermined condition exists on the multi-function peripheral; and printing the calibration chart on the multi-function peripheral after the determination of whether or not the print calibration should be performed.

20 Claims, 11 Drawing Sheets

(56) References Cited

U.S. PATENT DOCUMENTS

| | | | | |
|---|---|---|---|---|
| 2002/0114002 A1* | 8/2002 | Mitsubori | ......... | H04N 1/00326 |
| | | | | 358/1.15 |
| 2004/0158755 A1* | 8/2004 | Mitsubori | ......... | G03G 15/5004 |
| | | | | 713/323 |
| 2004/0160633 A1* | 8/2004 | Yoshikawa | ......... | H04N 1/6083 |
| | | | | 358/1.15 |
| 2004/0246504 A1* | 12/2004 | Mitsubori | ............. | G06K 15/02 |
| | | | | 358/1.1 |
| 2006/0061840 A1* | 3/2006 | Kashibuchi | ......... | H04N 1/6033 |
| | | | | 358/518 |
| 2006/0227386 A1* | 10/2006 | Nuuja | ................. | H04N 1/6033 |
| | | | | 358/406 |
| 2012/0063790 A1* | 3/2012 | Ogawa | .................... | B65H 5/26 |
| | | | | 399/16 |
| 2012/0133961 A1* | 5/2012 | Henderson | .......... | H04N 1/6033 |
| | | | | 358/1.9 |
| 2013/0342861 A1* | 12/2013 | Sato | .................... | H04N 1/6033 |
| | | | | 358/1.9 |
| 2014/0016156 A1* | 1/2014 | Fisher | ................ | H04N 1/00005 |
| | | | | 358/1.14 |
| 2014/0160498 A1* | 6/2014 | Yano | .................... | G06F 3/1208 |
| | | | | 358/1.9 |
| 2015/0063790 A1* | 3/2015 | Rodriguez | .......... | G11B 27/005 |
| | | | | 386/351 |
| 2015/0154477 A1* | 6/2015 | Yoo | ....................... | B41J 29/393 |
| | | | | 358/1.9 |
| 2015/0268896 A1* | 9/2015 | Hayashi | ............... | G06F 3/1205 |
| | | | | 358/1.9 |

* cited by examiner

SCAN CALIBRATION METHOD THAT ELIMINATES THE COLOR INACCURACY OF PRINTED COLOR CHARTS USED ON SCAN CALIBRATIONS

FIELD OF THE INVENTION

The present invention relates to a method and system for elimination the color inaccuracy of a printed color chart, which can be used in scan calibrations of color printers, multi-function peripherals (MFP) and/or image forming apparatuses.

BACKGROUND OF THE INVENTION

Scan calibration has recently been implemented into multi-function peripherals as a feature. However, because the scanner lamp (for example, fluorescent) light volume of an MFP can keep changing, scan calibration needs to be performed periodically. One popular method is to scan a printed color chart and compare the printed color chart data and original color chart data, and create a color correction table (or lookup table) based on the comparison. This method can work well, if the condition of the MFP is such that the MFP can accurately print the color chart.

However, in order to correctly generate the color correction table, the MFP must be in a condition that the MFP can correctly print the color chart. One problem that can occur is that the printing colors can change because of the effectiveness of the photoconductor drum is reduced with age. For example, if scan calibration is executed in the condition when the color printing of the MFP is poor, the corresponding color correction table will also be of poor quality.

A method and system is disclosed that checks the print calibration status before scan calibration to help improve the accuracy of the color correction table. In accordance with an exemplary embodiment, for example, to help improve the accuracy of the color correction chart, a print calibration of the MFP can be performed before the scan calibration. Alternatively, if a print calibration is not needed, the scan calibration can be immediately performed.

SUMMARY OF THE INVENTION

In consideration of the above issues, it would be desirable to have a scan calibration method, which can help eliminate the color inaccuracies of printed color charts used in scan calibrations of color printers, multi-function peripherals, and image forming apparatuses.

In accordance with an exemplary embodiment, a method is disclosed of executing a scan calibration program on multi-function peripherals, the method comprising: receiving a request for initiation of a scan calibration program on a multi-function peripheral; determining whether or not a print calibration should be performed on the multi-function peripheral before printing a calibration chart on the multi-function peripheral, wherein the determination of whether or not to execute the print calibration is based on a predetermined condition of the multi-function peripheral; executing the print calibration on the multi-function peripheral, if the predetermined condition exists on the multi-function peripheral; and printing the calibration chart on the multi-function peripheral after the determination of whether or not the print calibration should be performed.

In accordance with a further exemplary embodiment, a non-transitory computer readable recording medium stored with a computer readable program code for executing a scan calibration program on a multi-function peripheral with a printed calibration chart is disclosed, the computer readable program code configured to execute a process comprising: receive a request for initiation of a scan calibration program on a multi-function peripheral; determine whether or not a print calibration should be performed on the multi-function peripheral before printing a calibration chart on the multi-function peripheral, wherein the determination of whether or not to execute the print calibration is based on a predetermined condition of the multi-function peripheral; execute the print calibration on the multi-function peripheral, if the predetermined condition exists on the multi-function peripheral; and print the calibration chart on the multi-function peripheral after the determination of whether or not the print calibration should be performed.

In accordance with another exemplary embodiment, a method is disclosed of executing a scan calibration program on a multi-function peripheral with a calibration chart in a network of multi-peripherals, the method comprising: receiving a request for execution of a scan calibration program on a first multi-function peripheral; sending a requesting from the first multi-function peripheral to a server to identify at least one of a plurality of multi-function peripherals within the network of multi-function peripherals having a print condition that does not need to be calibrated; identifying a second multi-function peripheral from the at least one of the plurality of multi-function peripherals having a print condition that does not need to be calibrated; sending a print request from the first multi-function peripheral to the second multi-function peripheral to print a calibration chart; printing the calibration chart on second multi-function peripheral; scanning the calibration chart on a scanner of the first multi-function peripheral to obtain a printed scan calibration for the first multi-function peripheral; creating a correction table based on a comparison of the printed scan calibration data to a stored scan calibration data for the first multi-function peripheral; and applying the correction table to scan jobs executed by the first multi-function peripheral.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, a system and method of executing a scan calibration program on an image forming apparatus or multi-function peripheral with a printed color calibration chart is disclosed. The methods as disclosed herein can also include calibration of black and white images and/or grayscale images. The following illustrations describe the process of this method and a system for implementation thereof.

Figure 1:
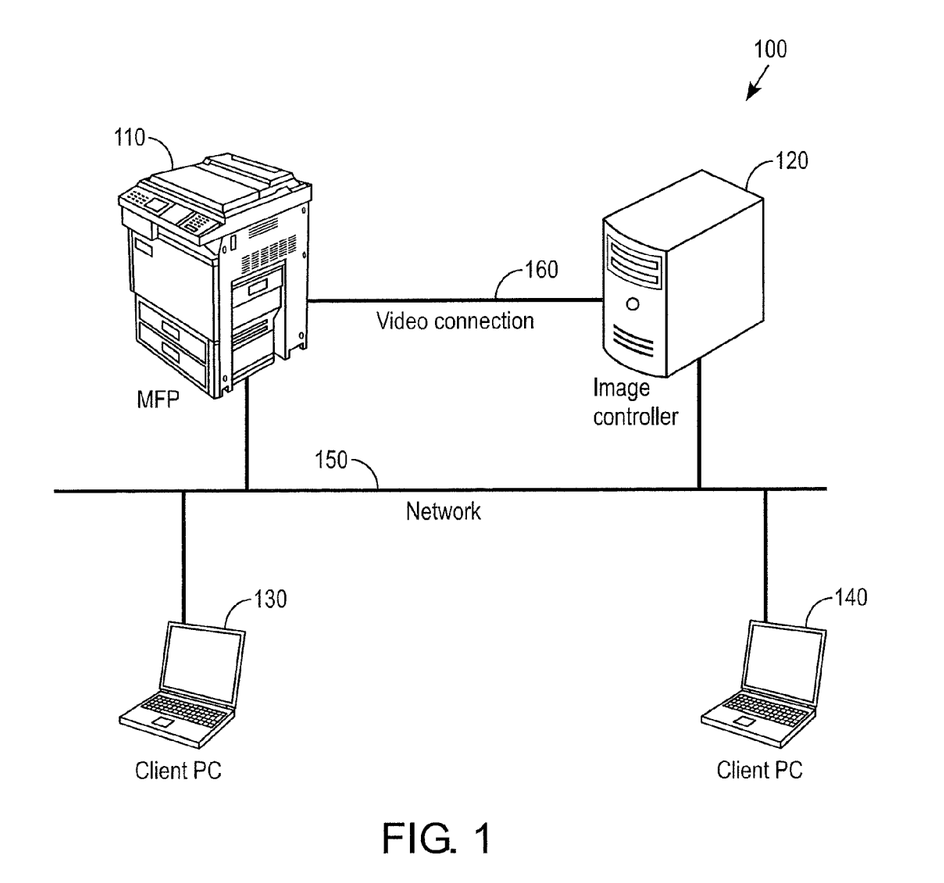
FIG. 1 is a diagram of an exemplary system, which can help eliminate the color inaccuracy of a printed color chart, and wherein the system includes at least one multi-function peripheral (MFP) and an image controller in accordance with an exemplary embodiment.

The methods described herein can be implemented in an image forming system 100 that can includes an multi-function peripheral 110 preferably in the form of a multi-function peripheral (MFP) or printer, an image controller 120, and one or more host devices 130, 140. In addition, the multi-function peripheral 110 and the image controller 120 can be connected via a video connection 160, for example, such as a dedicated bus or video I/F cable (video interface cable).

In accordance with an exemplary embodiment, the image controller 120 receives a print job of page description language format from one or more client (or client devices) 130, 140, through a network connection 150, and applies a raster image processor (or RIP) processing or screening and image processing to raster data of the print job. The binary image data and job ticket are then sent to the multi-function peripheral 110 via the video connection 160. In the multi-function peripheral 110, image adjustment processing is applied to the binary image data, and printing is carried out. In accordance with an exemplary embodiment, the image controller 120 can execute the scan calibration and print calibration.

The multi-function peripheral (or printer) 110 can include a printer controller (or firmware), an image processing section (or data dispatcher), a print engine, an input/output (I/O) section, and a scanner. For example, the printer controller can include a central processing unit (CPU), a random access memory (RAM), and a read only memory (ROM). The printer controller processes the data and job information received from the one or more host devices 130, 140 to generate a print image. The printer controller also includes an operating system (OS), which acts as an intermediary between the software programs and hardware components within the multi-function peripheral. The operating system (OS) manages the computer hardware and provides common services for efficient execution of various software applications. In accordance with an exemplary embodiment, the printer controller can process the data and job information received from the one or more host devices 130, 140 to generate a print image, and/or alternatively, the image controller 120 can process the data and job information received from the one or more host devices 130, 140 to generate a print image.

For example, in accordance with an exemplary embodiment, the image processing section within the multi-function peripheral 110 can carry out various image processing under the control of the printer controller (or image controller 120), and sends the processed print image data to the print engine. The image processing section also includes a scanner section for optically reading a document, such as an image recognition system. The scanner section receives the image from the scanner and converts the image into a digital image. The print engine forms an image on a recording sheet based on the image data sent from the image processing section. The I/O section performs data transfer with the host device 110. The controller can be programmed to process data and control various other components of the multi-function peripheral to carry out the various methods described herein. The print engine forms an image on a sheet of print medium (for example, a recording sheet) based on the image data sent from the image processing section.

The input/output (I/O) port provides communications between the printer section and the one or more host devices 130, 140 and receives page descriptions (or print data) from the host for processing within the multi-function peripheral 110. In accordance with an exemplary embodiment, the operation of printer section commences when it receives a page description from the one or more host devices 130, 140 via I/O port in the form of a print job data stream and/or fax data stream. The page description may be any kind of page description languages (PDLs), such as PostScript® (PS), Printer Control Language (PCL), Portable Document Format (PDF), and/or XML Paper Specification (XPS). The multi-function peripheral 110 can also include an auto feeding mechanism or tray, wherein a user can feed one or more sheets or pages of a printed image, cover sheet of a package of print media and/or other documents to the image processing section for imaging and processing.

In accordance with an exemplary embodiment, the one or more host devices 130, 140 can include a processor, and one or more memories for storing software programs and data (such as files to be printed). In accordance with an exemplary embodiment, the one or more host devices 130, 140 can include a multi-function peripheral, an image forming apparatus, a personal computer, a portable device such as a notebook personal computer, desktop computer, a mainframe, a kiosk, a cable box, a mobile, cellular or smart phone, a personal digital assistant (PDA), a router, an intermediary device and/or server and like devices and/or systems, which send data over a communication network 150.

In accordance with an exemplary embodiment, the multi-function peripheral 110, the image controller 120, and the one or more host devices 130, 140 can be connected to one another via communication network 150. For example, the communication network 150 can be a public telecommunication line and/or a network (e.g., LAN or WAN) 150.

Examples of the communication network 150 can include any telecommunication line and/or network consistent with embodiments of the disclosure including, but are not limited to, telecommunication or telephone lines, the Internet, an intranet, a local area network (LAN), a wide area network (WAN) and/or a wireless connection using radio frequency (RF) and/or infrared (IR) transmission.

Examples of multi-function peripherals 110 consistent with exemplary embodiments of the invention include, but are not limited to, a multi-function peripheral (MFP), a laser beam printer (LBP), an LED printer, a multi-function laser beam printer including copy function. In accordance with an exemplary embodiment, the multi-function peripheral 110 is a color printer. In accordance with another embodiment, the multi-function peripheral 110 can be configured as a multi-function peripheral (MFP) device or all-in-one (AIO) that includes a printer section for converting print data inputted from outside to image data and forming and printing out the converted image onto a printable media, a scanner section for optically reading a document (for example, an image recognition system), and a facsimile section for facsimile receiving and transmitting image data to and from external apparatuses through public telecommunication lines.

Figure 2:
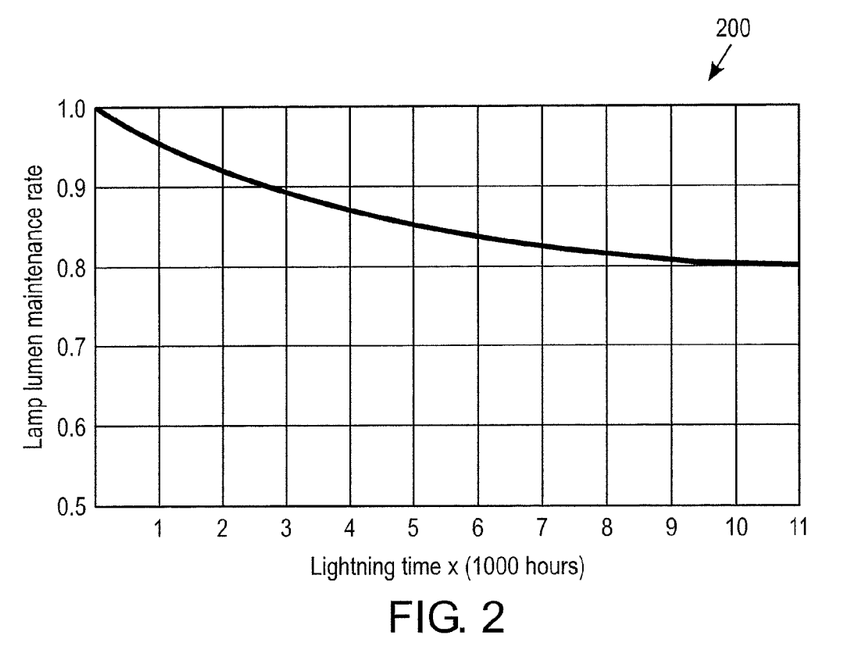
FIG. 2 is an example of a correlation chart showing "lighting time" versus "lamp lumen maintenance rate" in accordance with an exemplary embodiment.

FIG. 2 is an example of a correlation chart 200 showing "lighting time" versus "lamp lumen maintenance rate" in accordance with an exemplary embodiment. In use, the scanner section can scan an original image or document by placing the original image or document on an original platen of the scanner unit, which is irradiated with an exposure lamp included in the scanner section. The scanner scans an entire image and the reflected light from a surface of the original forms an image on a CCD (Charge Coupled Device) through mirrors and a collecting lens. The CCD converts the reflected light from the surface of the original to color data (analog signal) of RGB and outputs the same to a scanner controller. The color data that the CCD outputs to the scanner controller can be referred to as image data.

A scanner controller can apply a predetermined image processing to the image data inputted from CCD to output digital signals to an image controller 120. The digital signals outputted from the scanner controller to the image controller 120 can be, for example, image color data C for cyan, image color data M for magenta, image color data Y for yellow, and image color data K for black. During the printing of the image, the print controller outputs laser beams to respective photoreceptor drums of cyan, magenta, yellow and black, based on the inputted image color data C, M, Y, and K. However, as shown in FIG. 2, the lamp lumen maintenance rate (y-coordinate) decreases over lighting time (x-coordinate), which can result in changes to readings obtained by the scanner.

Figure 3:
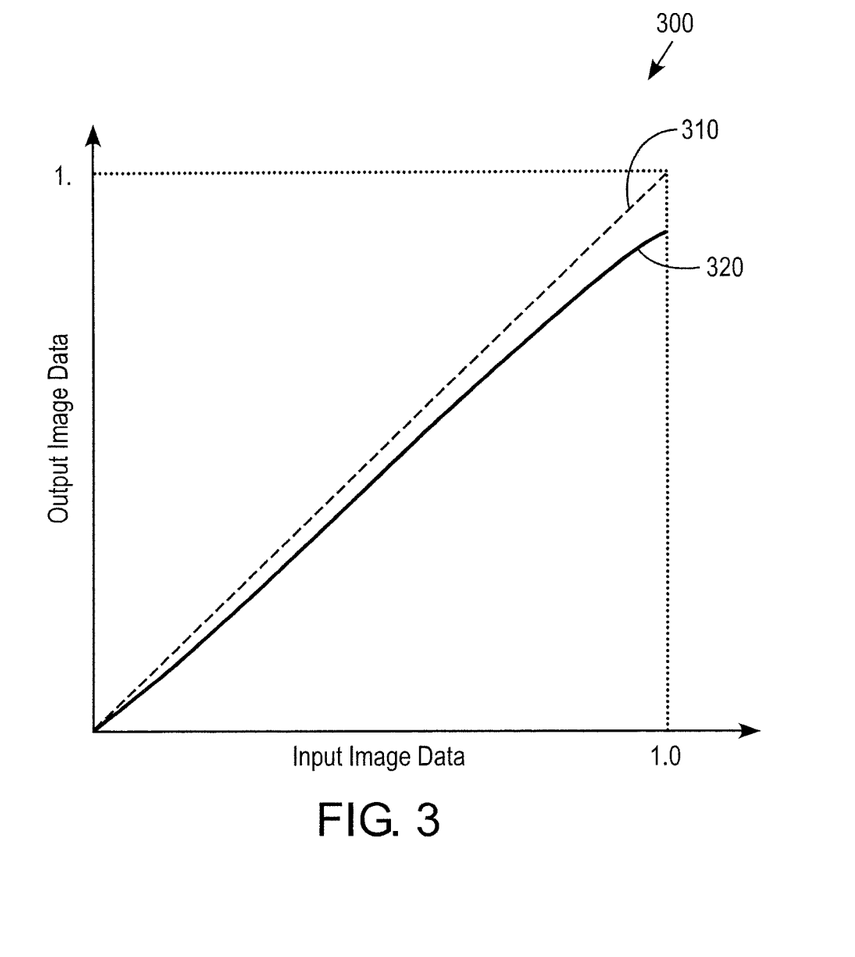
FIG. 3 is an example of a color correction table, which shows the differences between an actual or "printed color chart scan data", and an ideal or "original color chart data" in accordance with an exemplary embodiment.

FIG. 3 is an example of a color correction table (or conversion table) 300, which shows the differences between an actual or "printed color chart scan data" 310, and an ideal or "original color chart data" 320 in accordance with an exemplary embodiment. As shown in FIG. 3, the color correction table 300 can be a lookup table (LUT), which can include output image data (y-coordinate) and the input image date (x-coordinal), and which can be configured to correct the actual reading 320 to the ideal reading 310 by, for example, changing and/or compensating the CCD to obtain an ideal reading. For example, the LUT can be an LUT (L*a*b* values=>CMYK values) in which device values (CMYK values) respectively corresponding to 3-dimensional lattice points formed from L*, a*, and b* can be created.

Figure 4:
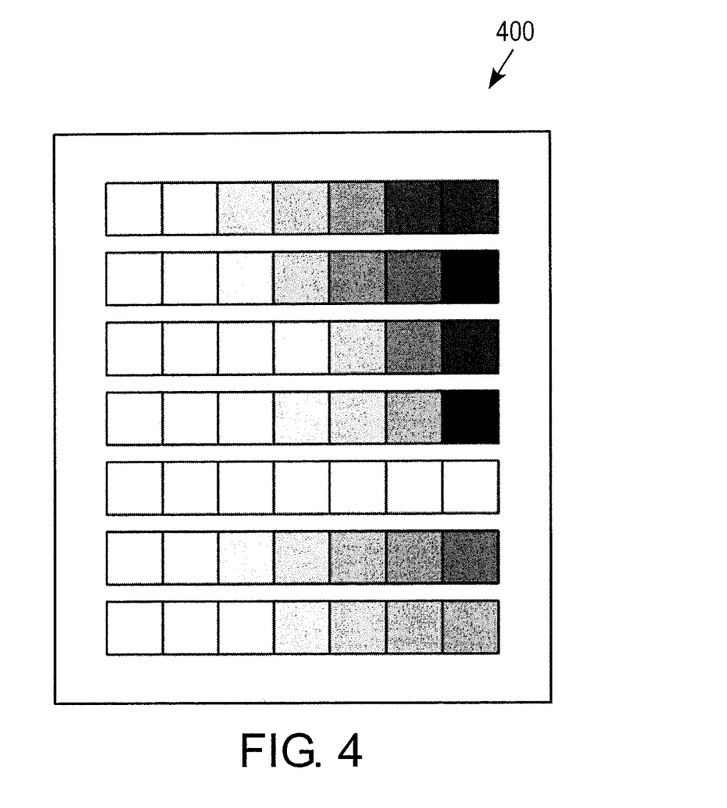
FIG. 4 is an example of a color chart in accordance with an exemplary embodiment.

FIG. 4 is an example of a color chart 400 in accordance with an exemplary embodiment. As shown in FIG. 4, the color chart 400 can be a mosaic of colors which can be generated, for example, using toners having drums of cyan, magenta, yellow and key (black) ("CMYK"). For example, the color chart 400 has total 49 color patches, and all 49 color patches data are already known by the image controller 120. The color chart 400 as shown in FIG. 4 is an exemplary embodiment, and the color chart 400 can include any number of color patches, which can be dispersed in a pattern in accordance with known color charts. In addition, the color chart 400 can include combinations of images, texts, and/or color patches. The color chart 400 preferably includes colors associated with the L*a*b* color space, which can include all perceivable colors, including those of the RGB and CMYK color models. In accordance with an exemplary embodiment, the image controller 120 can host or store the color chart 400 as shown in FIG. 4 inside a memory module within the image controller 120.

Figure 5:
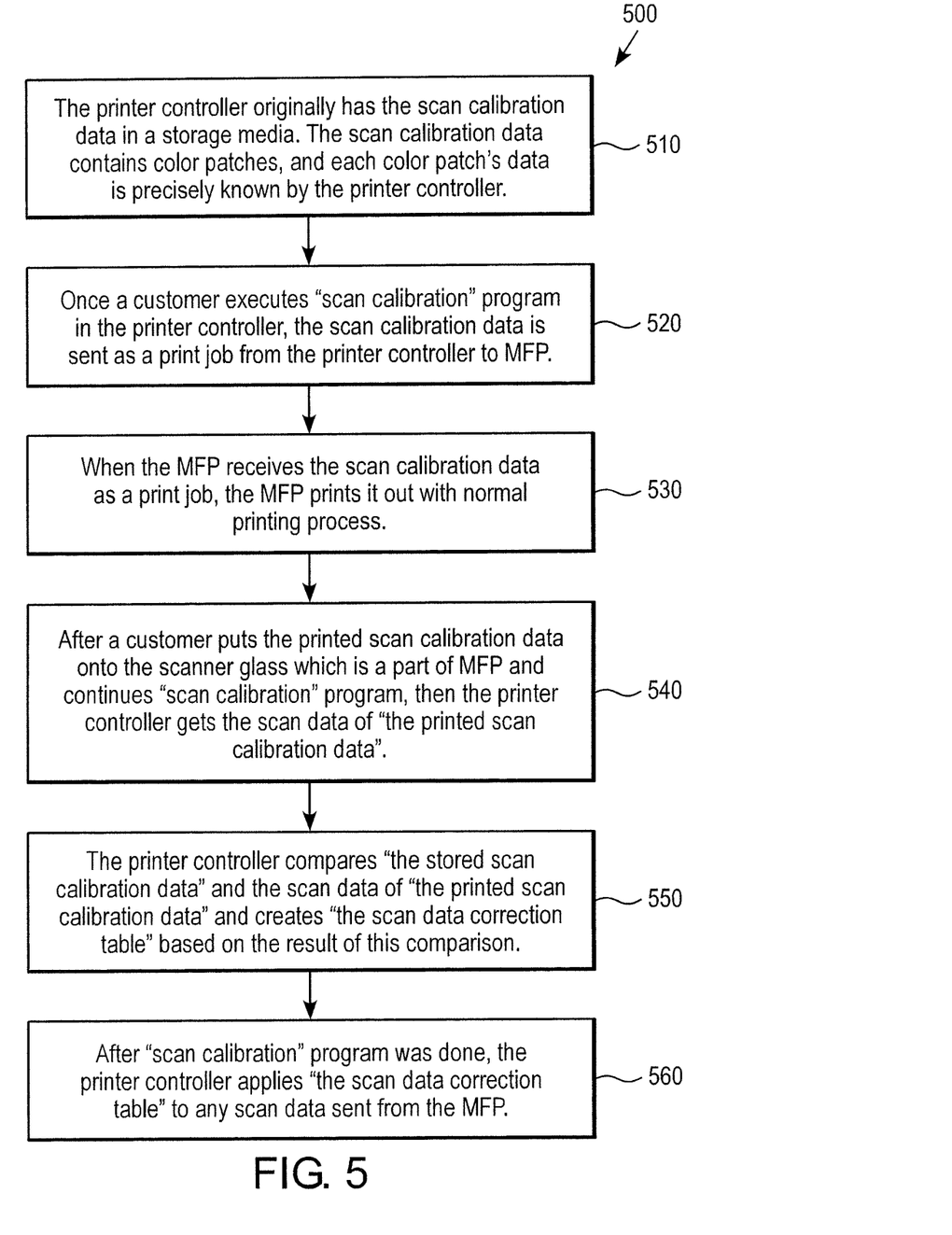
FIG. 5 is a flow chart of an exemplary embodiment of a method for scan calibration which can eliminate color inaccuracies of a printed color chart used in scan calibrations according to an exemplary embodiment.

FIG. 5 is a flow chart 500 of an exemplary embodiment of a method for scan calibration which can help eliminate color inaccuracies in a printed color chart used in scan calibrations of an multi-function peripheral 110 in the form of a multi-function peripheral according to an exemplary embodiment. As shown in FIG. 5, in step 510, the image controller (or printer controller embedded in the MFP) 120 can be configured to host the scan calibration data in a storage media. For example, the scan calibration data can include color patches, and wherein the image controller 120 precisely knows each color patch's data. In step 520, once a customer executes "scan calibration" program in the image controller 120, the scan calibration data is RIPped and sent as a print job from the image controller 120 to the MFP 110. Alternatively, in accordance with an exemplary embodiment, the MFP 110 can be configured to execute a scan calibration after a predetermined number of pages have been printed in connection with the image controller 120.

In step 530, when the MFP 110 receives the scan calibration data as a print job, and the MFP 110 prints out the scan calibration data as a color chart with the normal printing process. In step 540, the customer places the printed color chart (i.e., printed scan calibration data) onto the glass of the scanner, which is part of the MFP 110, and the color chart is scanned by the MFP 110. In accordance with an exemplary embodiment, the scan calibration data from the MFP 110 is sent via the video connection 160 to the image controller 120. In step 550, the image controller 120 compares "the stored scan calibration data" 310 and the scan data of "the printed scan calibration data" 320 and creates a "scan data correction table", which can also be referred to as a "color correction table", based on the results of the comparison. In step 560, after "scan calibration" program is completed, the image controller 120 can apply "the scan data correction table" or "color correction table" to data sent from the MFP 110 to the image controller 120 for processing.

In accordance with an exemplary embodiment, a method and system is disclosed, such that when the scan calibration is executed, the scan calibration program checks the print calibration status and toner remaining status of the MFP 110. If the print calibration status and toner remaining status are acceptable (for example, the print calibration was performed within a set or defined number of pages and the toner remaining is sufficient), the scan calibration can be performed immediately. If the print calibration status is not acceptable, for example, the print engine of the MFP 110 requires a print calibration because a certain number or amount of pages, for example, color pages have been printed, such that the color printing quality may be different than the desired print quality), the print calibration of the MFP 110 is automatically performed.

In accordance with an exemplary embodiment, the print calibration can include known print engine and/or print calibration methods and/or processes for the MFP 110. For example, it is known that an amount of toner attached to the photosensitive member and a transfer rate of toner onto the intermediate transfer belt can be influenced by an environment of the multi-function peripheral such as temperature and humidity, and variations in charging characteristics due to deterioration of toner over time. In accordance with an exemplary embodiment, the print calibrations can include adjustments to the belts, and/or image module and/or reader. Once the print calibration has been completed, the color scan calibration can be performed as disclosed herein. In addition, if the remaining toner status is not sufficient, for example, one or more of the toner cartridges or modules are low or empty, the scan calibration program can be aborted, and the one or more of the toner cartridges or modules can be replaced and/or refilled.

Figure 6:
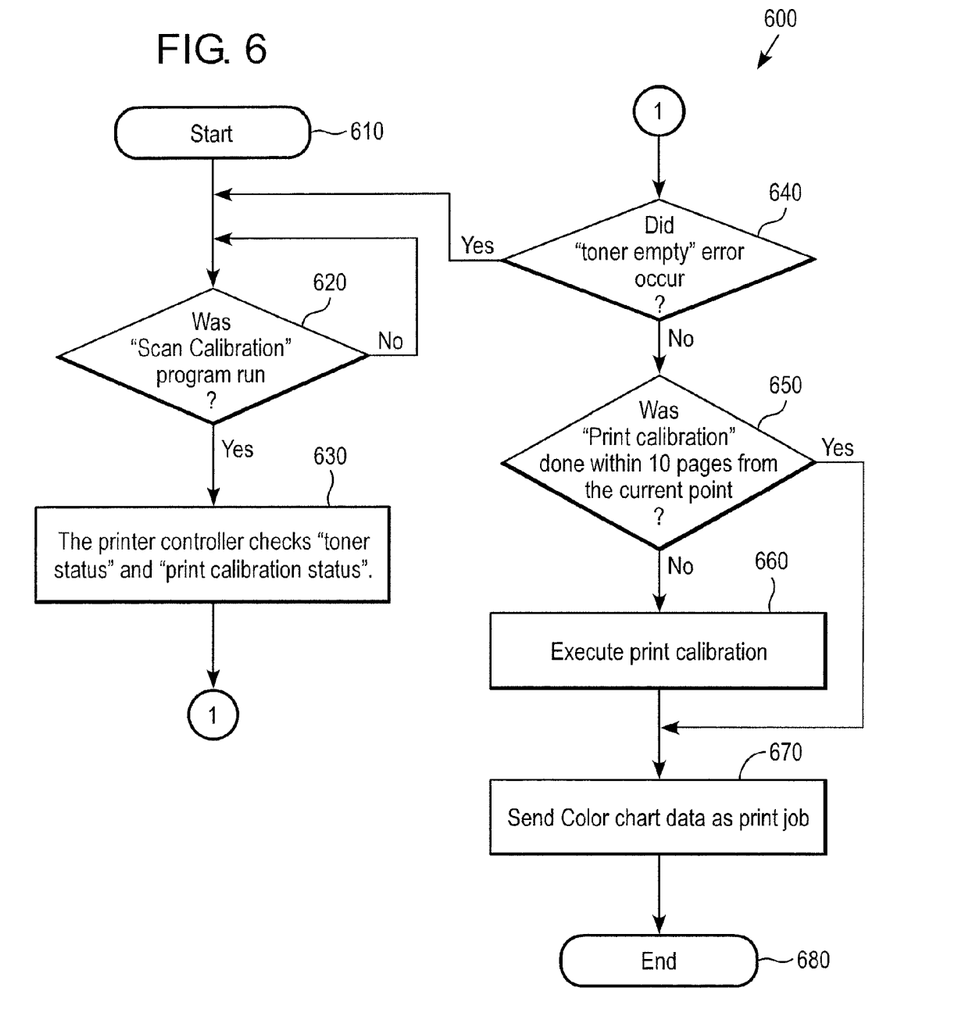
FIG. 6 is a flow chart of an exemplary embodiment of a method for controlling print calibration during a scan calibration program in accordance with an exemplary embodiment.

FIG. 6 is a flow chart 600 of an exemplary embodiment of a method for controlling print calibration during a scan calibration in accordance with an exemplary embodiment. In accordance with an exemplary embodiment, the process starts in step 610, wherein a request for a scan calibration is made by a user for the MFP 110. Alternatively, the request to execute the scan calibration program can be made after a predetermined number of scanned pages. In step 620, the image controller 120 checks the "toner status" and the "print calibration status" by communicating with MFP 110. In accordance with an exemplary embodiment, in step 640, if the "toner status" is empty (or low), the scan calibration is aborted. Alternatively, if the "toner status" is not empty (or low in step 640), and the "print calibration" has been performed on the MFP 110 within a predetermined number of pages, for example, 10 pages from the current print status, (step 650), the image controller 120 sends a color chart 400 to the MFP 110 as a print job and the process proceeds as shown in FIG. 5, steps 520-560.

Alternatively, in accordance with an exemplary embodiment, if the "print calibration" has not be performed within the predetermined number of pages, for example, 10 pages from the current point (step 650), a print calibration is automatically performed in step 660 on the MFP 110. After the print calibration is performed in step 670, the image controller 120 sends the color chart 400 to the MFP 110 as a print job and the process proceed as shown in FIG. 5, steps 520-560 as described above. The process ends in step 680.

Figure 7A:
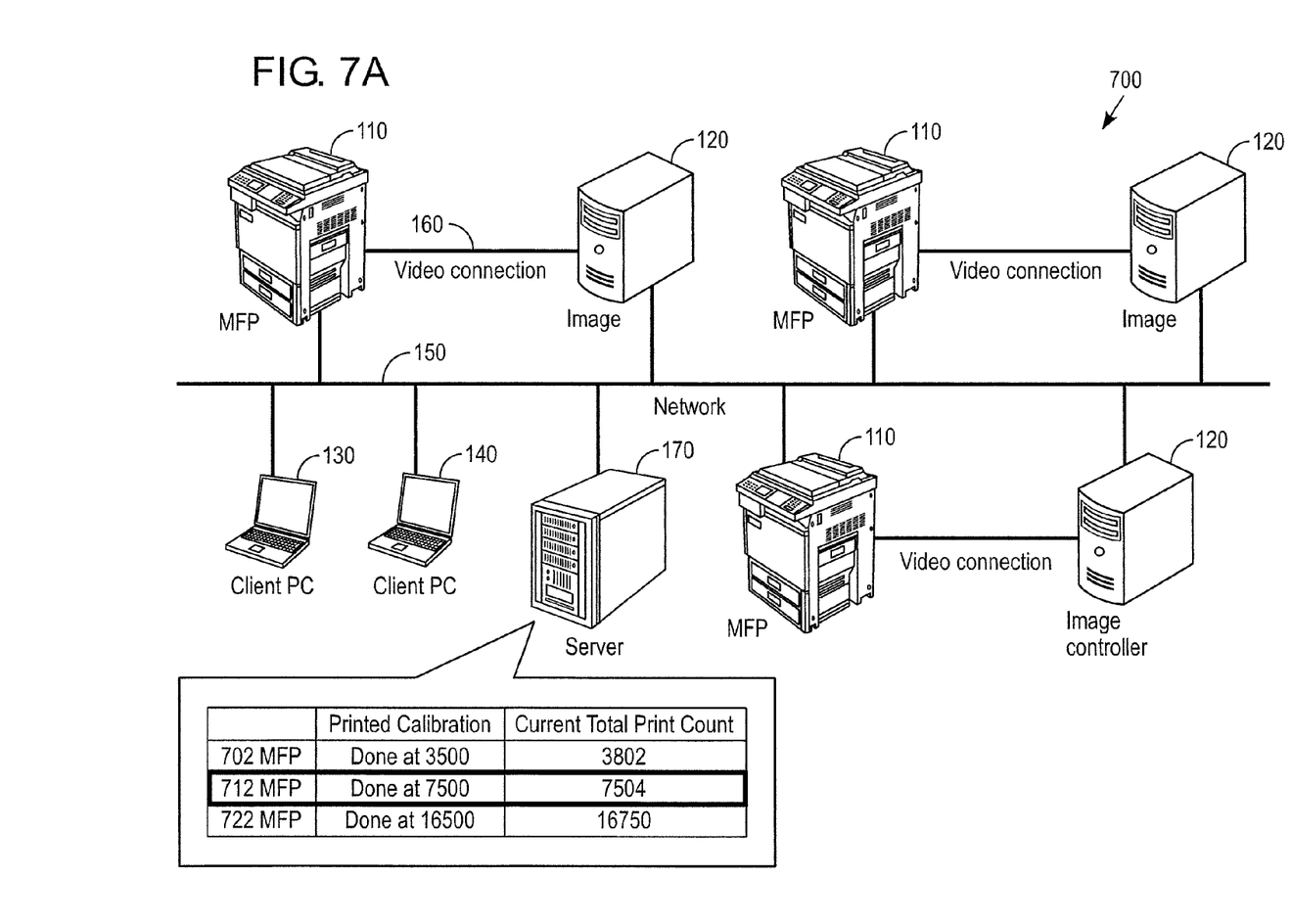
FIG. 7A is a diagram of an exemplary system, which can help eliminate the color inaccuracy of a printed color chart, and wherein the system includes a plurality of multi-function peripherals and image controllers in accordance with an exemplary embodiment.

FIG. 7A is a diagram of an exemplary system 700, which can help eliminate the color inaccuracy of a printed color chart 400, and wherein the system 700 includes a plurality of multi-function peripheral 110 (e.g., MFP 702, MFP 712, MFP 722) and image controllers 120 (703, 713, 723) in accordance with an exemplary embodiment. As shown in FIG. 7A, the methods described herein can be implemented in an image forming system 700 that can includes a plurality of multi-function peripherals 110, preferably in the form of a multi-function peripherals (MFP) (702 MFP, 712 MFP, 722 MFP) or printers, and wherein each of the plurality of multi-function peripherals 110 has an image controller (or printer controller) 120 associated therewith. In addition, the system 700 can also include one or more host devices 130, 140, and a print server 170. Each of the plurality of multi-function peripherals 110 and image controllers 120 can be connected via a video connection 160 (701, 711, 721), such as a dedicated bus or video I/F cable (video interface cable) 160.

In accordance with an embodiment, the print server 170 can be configured to manage the print calibration status for each of the one or more multi-function peripherals 110 (702 MFP, 712 MFP, 722 MFP). For example, the print server 170 can include a processor, and one or more memories for storing software programs and data (such as files to be printed). In accordance with an exemplary embodiment, the data hosted by the print server 170 can include the identity of the one or more multi-function peripherals 110 (for example, 702 MFP, 712 MFP, 722 MFP), a print calibration status, for example, which can include when each of the one or more multi-function peripherals 110 were last calibrated including the number of pages in which the calibration was performed, and a current total print count for each of the multi-function peripherals 110.

Figure 7B:
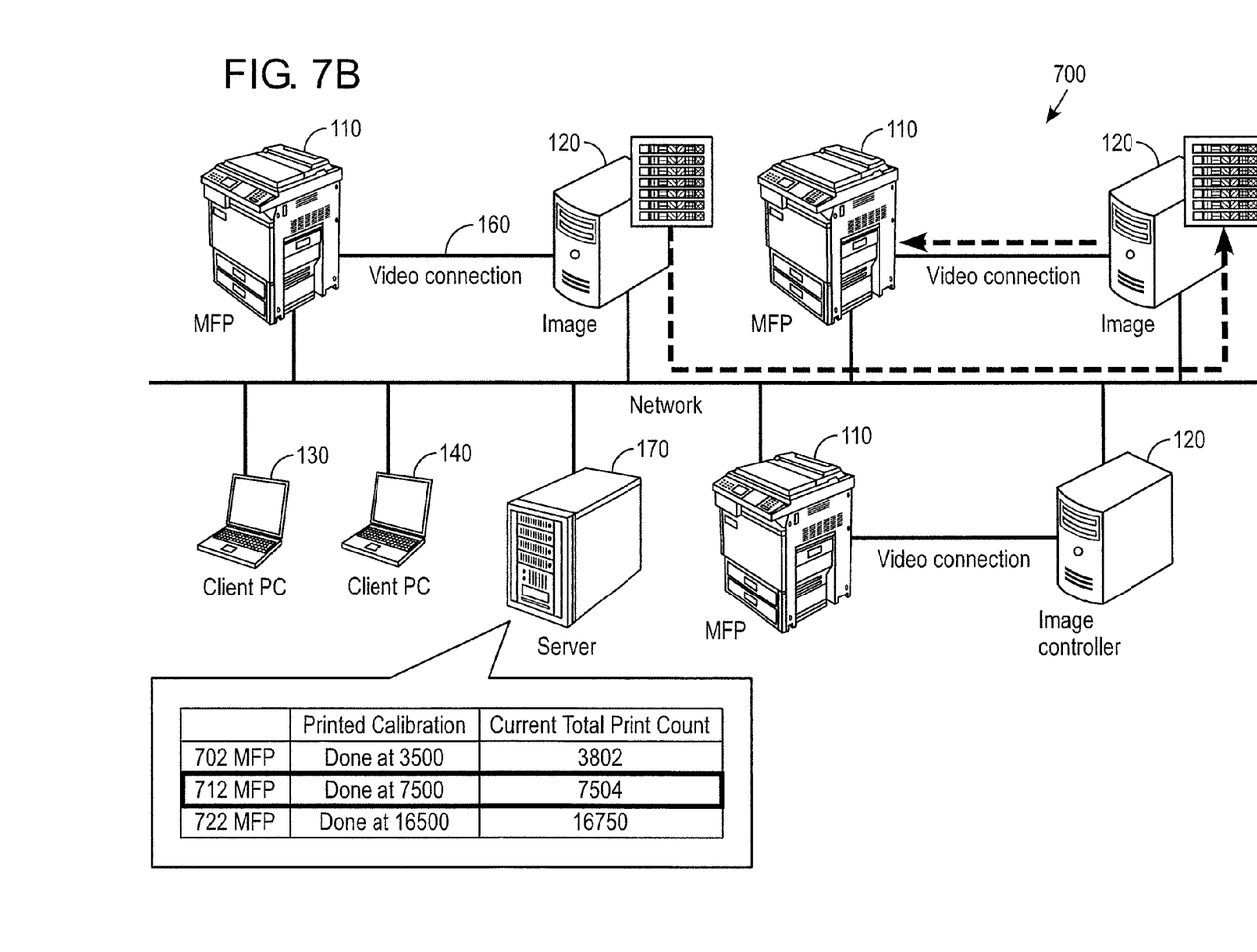
FIG. 7B is a diagram of an exemplary system showing an exemplary embodiment, which can eliminate the color inaccuracy of a printed color chart with a system as shown in FIG. 7A.

FIG. 7B is a diagram of an exemplary system showing an exemplary embodiment, which can help eliminate the color inaccuracy of a printed color chart 400 within a system 700 as shown in FIG. 7A. In accordance with an exemplary embodiment, once a customer (or user) executes a "scan calibration" on one of the plurality of multi-function peripherals 110, for example, MFP 702, the print server 170 can determine if one of a plurality of multi-function peripherals 110 within a network of multi-function peripheral 110, for example, MFP 702, MFP 712, MFP 722 has a print condition that does not need to be calibrated. For example, as shown in FIG. 7B, if MFP 712 does not need to be calibrated, the IP address of the multi-function peripheral 110 (MFP 712) whose print condition does not have to be calibrated is obtained and the scan calibration data is send for printing a color chart 400 to the multi-function peripheral whose print condition does not have to be calibrated and is printed on the multi-function peripheral (MFP 712). The identity of the multi-function peripheral (MFP 712) performing the printing of the color chart 400 is sent to the requesting multi-function peripheral 110 (MFP 702) and/or alternatively, could be sent to one or more of the client devices 130, 140 (704 client device, 714 client device). The printed color chart 400 can then be scanned on the multi-function peripheral 110 (for example, MFP 702), which needs to be calibrated.

Figure 8A:
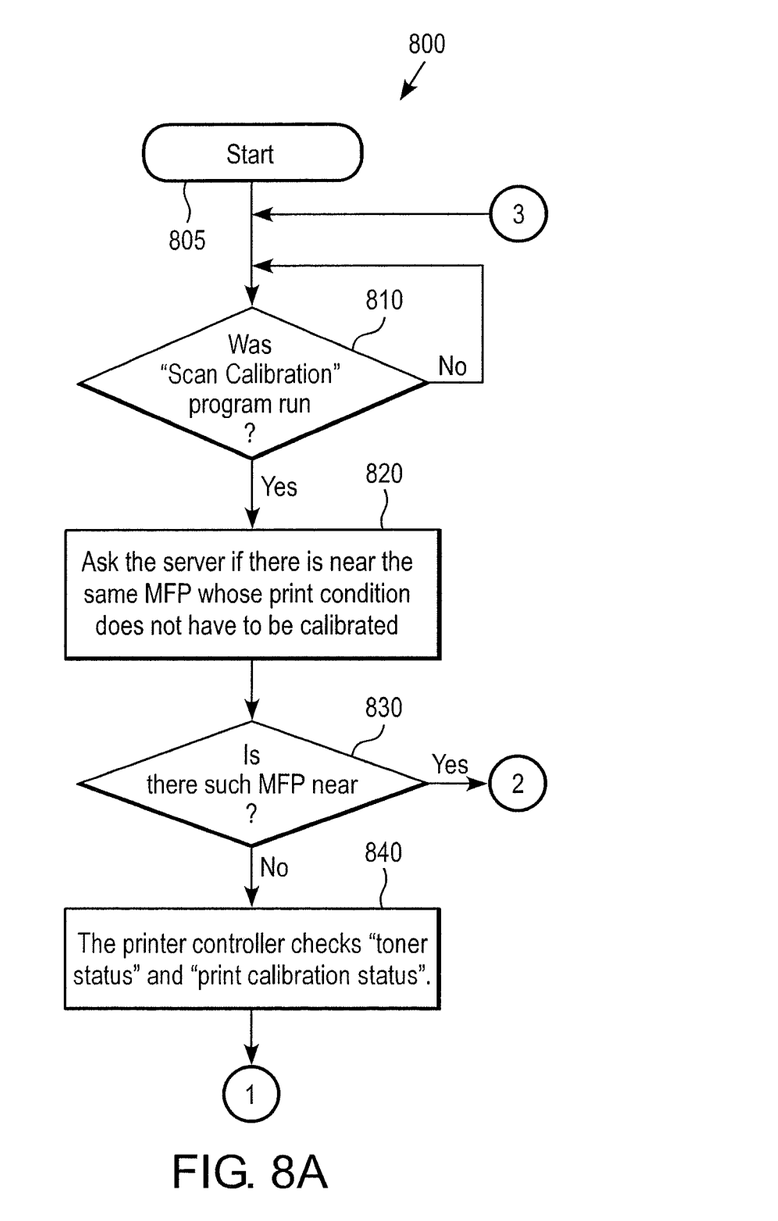
FIGS. 8A-8C are flow charts of an exemplary embodiment of a method for scan calibration which can eliminate color inaccuracies of a printed color chart used in scan calibrations according to an exemplary embodiment.
Figure 8B:
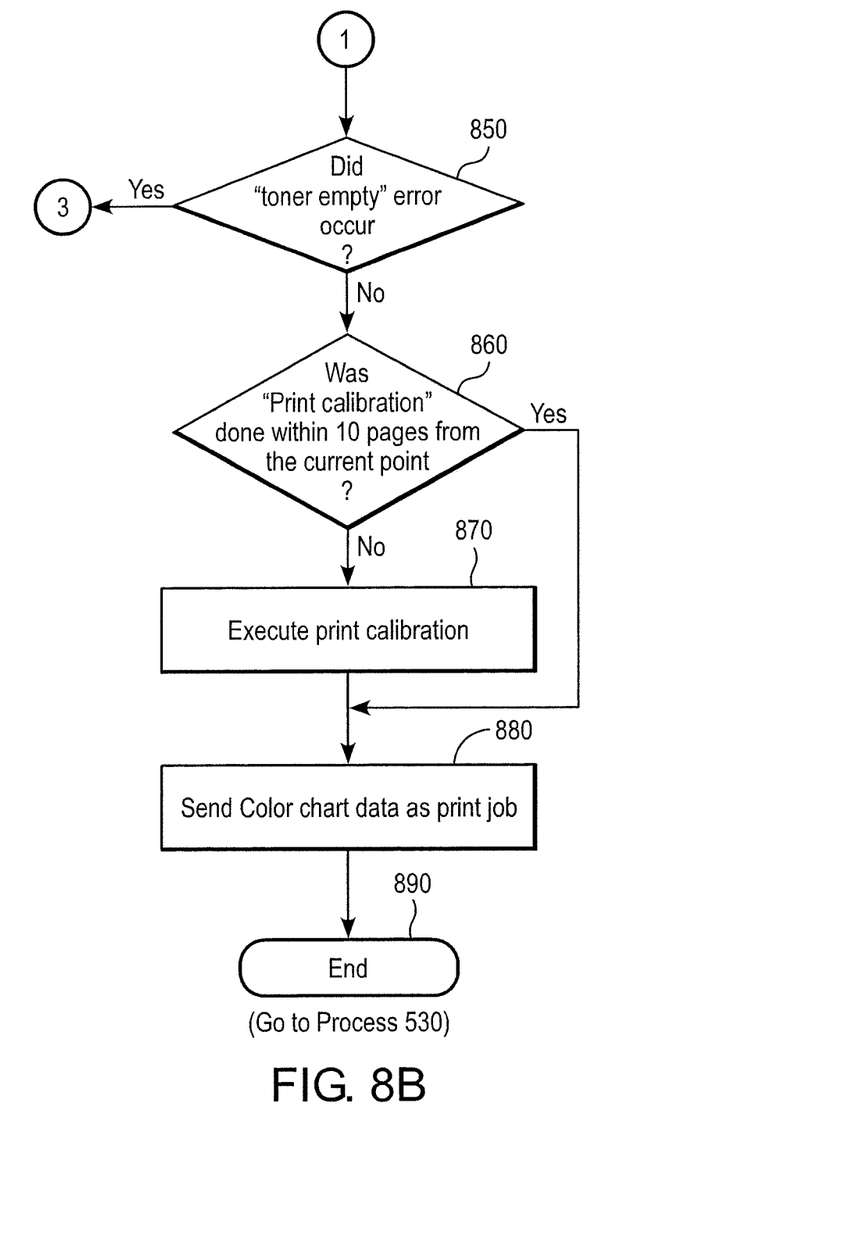
Figure 8C:
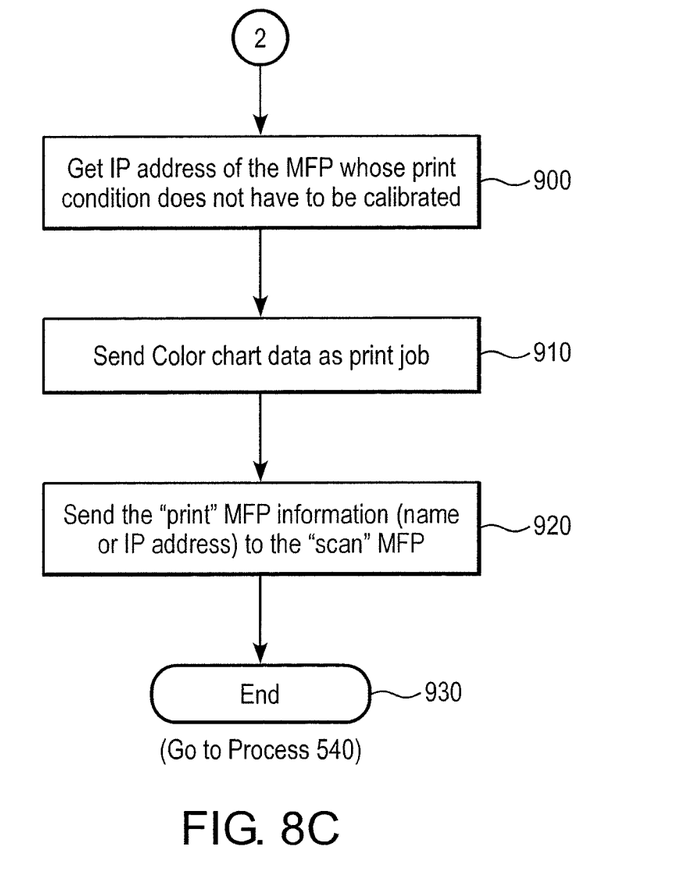

FIGS. 8A-8C are flow charts 800 of an exemplary embodiment of a method for scan calibration which can eliminate color inaccuracies of a printed color chart used in scan calibrations according to an exemplary embodiment. As shown in FIG. 8A, the process starts in step 805, wherein a request for a scan calibration program is made by a customer or user of a MFP 110 (for example, MFP 702). In accordance with an exemplary embodiment, the request for the scan calibration can be made from the MFP 110, or via, for example, one or more client devices 130, 140.

In accordance with an exemplary embodiment, in step 810, a determination is made by the image controller 120 (image controller 703) associated with the MFP 110 (MFP 702), if a "scan calibration" has been executed.

If the image controller 120 (image controller 703) determines that the MFP 110 (MFP 702) performs a "scan calibration", in step 820, the image controller 120 (Image controller 703) asks printer server 170 that, if there is the same type multi-function peripheral 110 within the network (or vicinity of the requesting multi-function peripheral). If there is the same type multi-function peripheral 110 in vicinity, the image controller 120 (Image controller 703) asks print server 170 again if the 'print calibration" program has been run on that MFP 110 within the predetermined number of pages. In step 830, if the print server 170 determines that no such MFP 110 is currently calibrated, the process continues to step 840 where the image controller 120 (image controller 703) checks "toner status" and "print calibration status" by communicating with MFP 110 (MFP 702).

In step 850 as shown in FIG. 8B, the image controller 120 (image controller 703) checks the "toner status" and the "print calibration status" by communicating with MFP 110 (MFP 702). In accordance with an exemplary embodiment, in step 850, if the "toner status" is empty (or low), the scan calibration can be aborted. If "toner status" is not empty (or low), (step 850), and if the "print calibration" was done within a predetermined number of pages on the MFP (for example, MFP 702 FIGS. 7A and 7B) in the step 860, for example 10 pages from the current point, in step 880, the image controller 120 (image controller 703) sends a color chart 400 to the MFP 110 (MFP 702) as a print job and the process proceed in step 890 to step 530 as shown in FIG. 5 and described above.

Alternatively, in accordance with an exemplary embodiment, if "print calibration" has not been performed within the predetermined number of pages, for example 10 pages from the current point (step 860), a print calibration is automatically performed in step 870. After the print calibration is performed, in step 880, the image controller 120 (image controller 703) sends the color chart 400 to the MFP 110 (MFP 702) as a print job and in step 890, the process proceeds to step 530 as shown in FIG. 5 and described above.

In accordance with an exemplary embodiment, in step 830, if the print server 170 determines that an multi-function peripheral 110, which is currently calibrated, for example, have a "print calibration" within a predetermined number of pages, the process continues to step 900 (FIG. 8C) where the image controller 120 (image controller 703) obtains the IP address of the multi-function peripheral 110 (for example, MFP 712) from print server 170, which is having a print calibration status that does not need to be calibrated. In step 910, the scan calibration data is sent for printing a color chart from image controller 120 (image controller 703) to the multi-function peripheral 110 (MFP 712) whose print condition does not have to be calibrated and is printed on the multi-function peripheral (MFP 712). In step 920, image controller 120 (image controller 703) sends MFP 110 (MFP 712) information which prints the color chart 400 to MFP 110 (MFP 702) which needs to be calibrated on scanner, for example, the name of IP address of the MFP. In step 930, the process proceeds to step 540 as shown in FIG. 5 and described above.

In accordance with another exemplary embodiment, a non-transitory computer readable recording medium stored with a computer readable program code for executing a scan calibration program on a multi-function peripheral with a printed calibration chart is disclosed, the computer readable program code configured to execute a process comprising: receive a request for initiation of a scan calibration program on a multi-function peripheral; determine whether or not a print calibration should be performed on the multi-function peripheral before printing a calibration chart on the multi-function peripheral, wherein the determination of whether or not to execute the print calibration is based on a predetermined condition of the multi-function peripheral; execute the print calibration on the multi-function peripheral, if the predetermined condition exists on the multi-function peripheral; and print the calibration chart on the multi-function peripheral after the determination of whether or not the print calibration should be performed.

The computer readable recording medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of executing a scan calibration program on multi-function peripherals, the method comprising:
receiving a request for initiation of a scan calibration on a multi-function peripheral, the scan calibration configured to calibrate a scanner on the multi-function peripheral;
determining whether or not a print calibration should be performed on the multi-function peripheral before printing a color calibration chart for calibrating the scanner on the multi-function peripheral, the print calibration configured to calibrate a print engine on the multi-function peripheral, and wherein the determination of whether or not to execute the print calibration is based on a predetermined condition of the multi-function peripheral;
executing the print calibration on the multi-function peripheral, if the predetermined condition exists on the multi-function peripheral; and
printing the color calibration chart on the multi-function peripheral after the determination of whether or not the print calibration should be performed.

2. The method of claim 1, comprising:
determining a toner status for each of the one or more toners in the multi-function peripheral, and if one or more of the toners is empty, aborting the scan calibration.

3. The method of claim 2, comprising:
scanning the color calibration chart on a scanner of the multi-function peripheral to obtain a printed scan calibration for the multi-function peripheral;
creating a correction table based on a comparison of the printed scan calibration data to a stored scan calibration data; and
applying the correction table to scan jobs executed by the multi-function peripheral.

4. The method of claim 3, wherein the correction table is a color data conversion lookup table.

5. The method of claim 1, wherein the predetermined condition comprises:
if a number a printed pages since the print calibration has been performed is greater than a predetermined number of pages; or
a change in a physical condition of the multi-function peripheral.

6. The method of claim 1, comprising:
storing the color calibration chart as scan calibration data on an image controller, the image controller being configured to be in network communication with the multi-function peripheral;
sending the scan calibration data as a print job from the image controller to the multi-function peripheral; and
receiving the scan calibration data on the multi-function peripheral and printing the scan calibration data on the multi-function peripheral.

7. The method of claim 1, comprising:
initiating the scan calibration after a number of printed copies on the multi-function peripheral.

8. A non-transitory computer readable recording medium stored with a computer readable program code for executing a scan calibration program on a multi-function peripheral with a printed calibration chart, the computer readable program code configured to execute a process comprising:
receive a request for initiation of a scan calibration on a multi-function peripheral, the scan calibration configured to calibrate a scanner on the multi-function peripheral;
determine whether or not a print calibration should be performed on the multi-function peripheral before printing a color calibration chart for calibrating the scanner on the multi-function peripheral, the print calibration configured to calibrate a print engine on the multi-function peripheral, and wherein the determination of whether or not to execute the print calibration is based on a predetermined condition of the multi-function peripheral;
execute the print calibration on the multi-function peripheral, if the predetermined condition exists on the multi-function peripheral; and
print the color calibration chart on the multi-function peripheral after the determination of whether or not the print calibration should be performed.

9. The computer readable storage medium of claim 8, comprising:
determining a toner status for each of the one or more toners in the multi-function peripheral, and if one or more of the toners is empty, aborting the scan calibration.

10. The computer readable storage medium of claim 9, comprising:
scanning the color calibration chart on a scanner of the multi-function peripheral to obtain a printed scan calibration for the multi-function peripheral;
creating a correction table based on a comparison of the printed scan calibration data to a stored scan calibration data; and
applying the correction table to scan jobs executed by the multi-function peripheral.

11. The computer readable storage medium of claim 10, wherein the correction table is a color data conversion lookup table.

12. The computer readable storage medium of claim 8, wherein the predetermined condition comprises:
if a number a printed pages since the print calibration has been performed is greater than a predetermined number of pages; or
a change in a physical condition of the multi-function peripheral.

13. The computer readable storage medium of claim 8, comprising:
storing the color calibration chart as scan calibration data on an image controller, the image controller being configured to be in network communication with the multi-function peripheral;
sending the scan calibration data as a print job from the image controller to the multi-function peripheral; and
receiving the scan calibration data on the multi-function peripheral and printing the scan calibration data on the multi-function peripheral.

14. The computer readable storage medium of claim 8, comprising:
initiating the scan calibration after a number of printed copies on the multi-function peripheral.

15. A method of executing a scan calibration program on a multi-function peripheral with a calibration chart in a network of multi-peripherals, the method comprising:
receiving a request for execution of a scan calibration on a first multi-function peripheral, the scan calibration configured to calibrate a scanner on the first multi-function peripheral;
sending a requesting from the first multi-function peripheral to a server to identify at least one of a plurality of multi-function peripherals within the network of multi-function peripherals having a print condition that does not need to be calibrated;
identifying a second multi-function peripheral from the at least one of the plurality of multi-function peripherals having a print condition that does not need to be calibrated;
sending a print request from the first multi-function peripheral to the second multi-function peripheral to print a color calibration chart for calibrating the scanner on the first multi-function peripheral;
printing the color calibration chart on second multi-function peripheral;
scanning the color calibration chart on a scanner of the first multi-function peripheral to obtain a printed scan calibration for the first multi-function peripheral;
creating a correction table based on a comparison of the printed scan calibration data to a stored scan calibration data for the first multi-function peripheral; and
applying the correction table to scan jobs executed by the first multi-function peripheral.

16. The method of claim 15, comprising:
printing the color calibration chart on the first multi-function peripheral if the print condition of the first multi-function peripheral does not need print calibration.

17. The method of claim 15, comprising:
storing the color calibration chart as scan calibration data on an image controller associated with the first multi-function peripheral, the image controller being configured to be in network communication with the first multi-function peripheral; and
sending the scan calibration data as a print job from the image controller to the second multi-function peripheral for printing.

18. The method of claim 15, comprising:
initiating the scan calibration after a number of printed copies on the first multi-function peripheral.

19. The method of claim 15, wherein the correction table is a color data conversion lookup table.

20. The method of claim 15, wherein sending the print request from the first multi-function peripheral to the second multi-function peripheral to print the color calibration chart comprises:

obtaining an IP address of the second multi-function peripheral; and sending print information to the first multi-function peripheral so as to identify the second multi-function peripheral.

\* \* \* \* \*